(No Model.)
W. C. BOWER.
FISH HOOK.
No. 310,118. Patented Dec. 30, 1884.
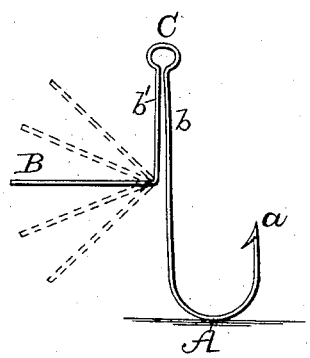
Witnesses:
Inventor:
W. C. Bower
by Abraham and Mayer
Att'ys.

UNITED STATES PATENT OFFICE.

WILLIAM C. BOWER, OF UNION SPRINGS, ALABAMA.

FISH-HOOK.

SPECIFICATION forming part of Letters Patent No. 310,118, dated December 30, 1884.

Application filed April 29, 1884. (No model.)

*To all whom it may concern:*

Be it known that I, WILLIAM C. BOWER, a citizen of the United States, residing at Union Springs, in the county of Bullock and State of Alabama, have invented a new and useful Improvement in Fish-Hooks, of which the following is a specification.

My invention relates to improvements in fish-hooks, as hereinafter set forth and described, and as illustrated in the drawing, made a part hereof, which represents my improved fish-hook.

My invention consists in a fish-hook provided with a rearwardly-extending lateral branch arm located at or near the point where the lower curve or loop ends, as specifically pointed out in the claim.

A is the curve or loop; $a$, the barb; B, the rearwardly-projecting branch arm; C, the line-eye; $b$, the hook-stem. Said branch arm B, which is the main feature of my invention, is preferably formed by a return of the stem downward parallel with the stem, as shown at $b'$, and then bending it at right angles thereto, as shown at B in the drawing; but it may be formed of a piece of wire bent into an angle, and then soldered or welded onto the stem $b$; or said extending branch may be placed in position by simply twisting one of its ends around the staff $b$, and then extending it rearwardly to form the branch arm B. Either of these modifications will be entirely within the scope of my invention. It is obvious, too, that my improvement is not limited to a hook having an eye, C. It is equally adaptable to a hook onto which the line is attached by a snood.

Among the advantages of my improvement may be stated that the fish is prevented from swallowing the hook; that when a fish bites at the hook, if its lips strike the projecting arm B, it will involuntarily close its mouth and be thus caught, and that the bait is at all times prevented slipping up the hook.

Although I have confined my description to a branch arm, B, at right angles relatively to the stem $b$, I do not wish to be understood as limiting myself to projecting said arm at such angle, as it may diverge therefrom and be entirely within the scope of my invention.

I have illustrated in the drawing various diverging angles in dotted lines.

What I claim is—

A fish-hook provided with a rigid rearwardly-extending branch arm, B, permanently attached at or near the upper termination of the lower curve of the hook, and on the side opposite the barb $a$, and having a free unattached end, as shown, as and for the purpose intended, substantially as described.

WILLIAM C. BOWER.

Witnesses:
T. E. WILLIAMS,
H. HARRIS.